Sept. 26, 1961  R. A. ENGEL ET AL  3,001,550
GAS REGULATOR
Filed July 20, 1959
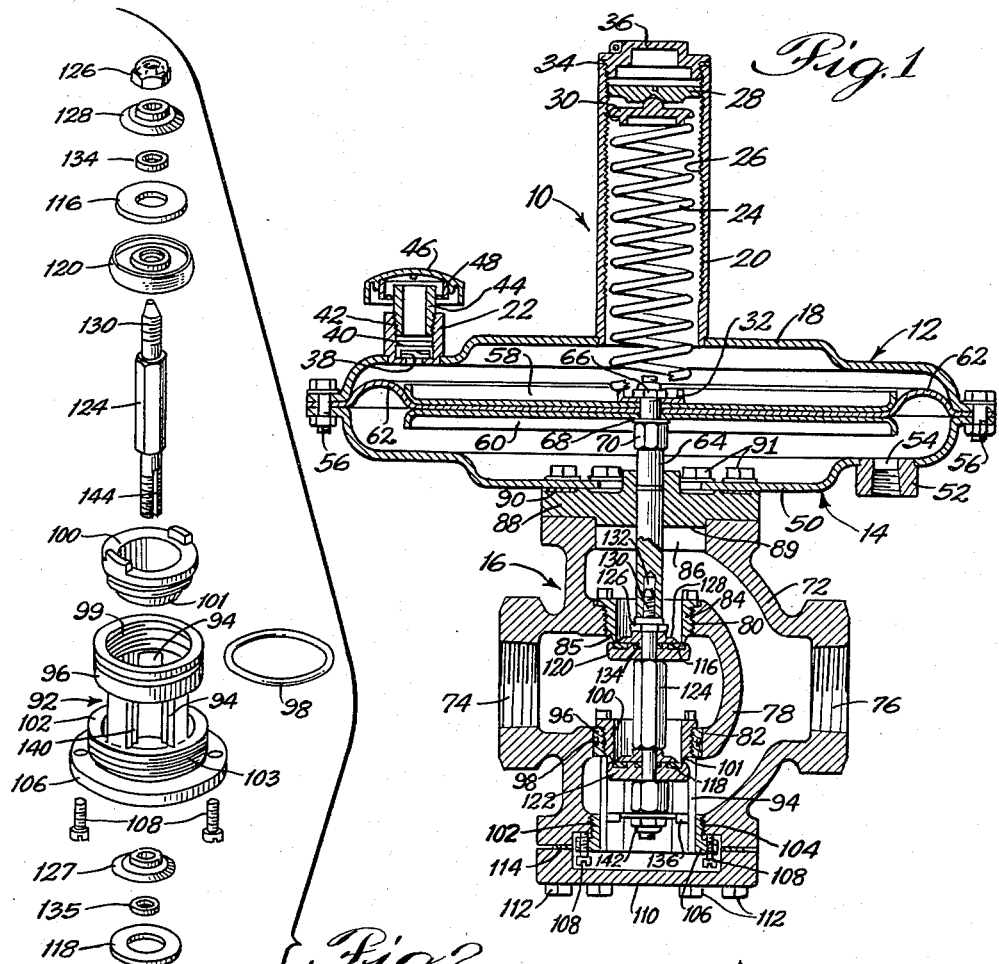
Fig.1
Fig.2
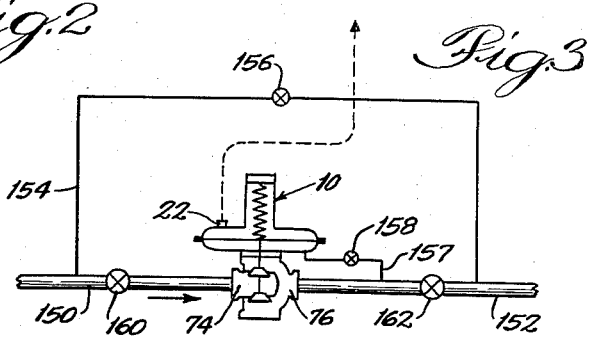
Fig.3
INVENTORS:
Cecil M. Johnson
and Raymond A. Engel,
BY Bair, Freeman & Molinare
ATTORNEYS.

3,001,550
GAS REGULATOR
Raymond A. Engel and Cecil M. Johnson, Marshalltown, Iowa, assignors to Fisher Governor Company, a corporation of Iowa
Filed July 20, 1959, Ser. No. 828,270
8 Claims. (Cl. 137—625.34)

This invention relates generally to an industrial gas regulator, and more particularly to an improved regulator for use primarily as a pressure reducing controller for large industrial and commercial gas installations.

Precision control of gas pressure is required for maximum gas combustion efficiency in large industrial and commercial gas installations. Such regulators are used as the final control elements for burner applications, installed just ahead of burner manifolds in industrial furnaces and large appliances. The industrial gas regulator of the present invention provides a new and improved inner valve structure for maintaining this accurate control, in spite of widely varying inlet pressures due to variations in distribution pressures or pressure drops in the pipeline.

It is the primary object of this invention, therefore, to provide an improved gas regulator construction providing pressure accuracy and versatility with a unique inner valve construction which is simple to install and maintain, and which operates with a minimum of attention.

It is another object of this invention to provide an industrial gas regulator characterized by simplicity of valve body design, in which the internal parts are constructed so that an inner valve and bottom seat ring are retained in a removable cage, thereby enabling disassembly of the inner valve structure without removing the valve body from the pipeline.

It is a further object of this invention to provide a novel removable cage assembly for an industrial gas regulator, wherein the seat-to-seat spacing of the inner valve may be readily adjusted, and wherein the inner valve is both top and bottom guided.

It is still another object of this invention to provide a fully balanced, double-ported regulator of exceptionally high capacity, which is economical to manufacture and simple to service.

It is still a further object of this invention to provide a double-ported regulator with adjustable seat-to-seat valve spacing and soft seated inner valve construction for absolute tight shut-off at low lock-up pressure.

Further objects and advantages of this invention will become apparent as the following description proceeds, and the features of novelty which characterize this invention will be pointed out with particularity in the claims annexed to and forming part of this specification.

A preferred embodiment of the invention is shown in the accompanying drawing, in which:

FIGURE 1 is a vertical cross sectional view taken through an industrial gas regulator constructed in accordance with the present invention;

FIGURE 2 is an exploded view of the parts assembly comprising the inner valve and cage assembly; and FIGURE 3 is a diagrammatic view of a typical practical installation.

Referring now more particularly to the drawing, the gas regulator of the present invention has been indicated generally at 10. The regulator construction 10 comprises an upper diaphragm casing assembly 12 and a lower diaphragm casing assembly 14. A valve body assembly 16 extends downwardly from the lower diaphragm casing assembly 14.

The upper diaphragm casing assembly 12 consists of an upper diaphragm casing 18 to which is welded a spring case 20 and a vent boss 22. The spring case 20 houses a main spring 24 and has its internal bore threaded at 26 to facilitate the spring adjustment. The outlet pressure setting of the regulator is adjusted by screwing an adjusting screw 28 within the spring case 20 along the threading 26. An upper spring seat element 30 and a lower spring seat element 32 serve to guide the main spring 24 on its inside diameter and maintain proper longitudinal alignment. The spring case enclosure is completed by means of a gasket 34 and a closure cap 36.

The vent boss 22 contains a flapper valve 38 and a snap ring 40 to limit linear movement of the flapper valve 38. The function of the flapper valve 38 is to give stability to the regulator. The vent boss 22 provides a threaded opening 42 which receives a vent assembly comprising a vent base 44, a vent cover 46, and a screen 48.

The lower diaphragm casing assembly 14 consists of a lower diaphragm casing 50 to which is welded a connection boss 52. The connection boss 52 is internally threaded to facilitate connection of the downstream control line, and serves to define an inlet port 54. The upper and lower diaphragm casings 18 and 50 are held together with a plurality of cap screws 56.

A diaphragm and head assembly is mounted within the diaphragm casing assemblies, and consists of two diaphragm heads 58 and 60, a diaphragm 62 disposed between the diaphragm heads 58 and 60, and the lower spring seat 32. A diaphragm rod 64 extends through a central opening in the diaphragm heads and diaphragm, and is secured by means of an elastic stop nut 66 to the lower spring seat element 32. A seal washer 68 and cooperating nut 70 provide a seal between the diaphragm rod 64 and the lower diaphragm head 60. In this way, a fluid-tight seal is maintained between the upper and lower diaphragm casing 18 and 50.

The valve body assembly 16 comprises a generally hollow body 72 having a main flow inlet 74 and a main flow outlet 76. An internal wall 78 serves to separate the inlet 74 from the outlet 76 within the valve body 72. An upper portion of the wall 78 defines a threaded opening 80, and a lower portion thereof defines a smooth opening 82 in coaxial alignment with the threaded opening 80. Each of the openings 80 and 82 is longitudinally coaxial with the diaphragm rod 64. An upper seat ring 84 is threadably received within the opening 80 and provides a downwardly-directed sharp annular valve seat 85.

The upper end of the valve body 72 provides a top opening 86. A head flange 88 is disposed across the upper end of the valve body 72 and provides a central boss portion 89 extending into the top opening 86. A gasket 90 and cap screw means 91 serve to secure both the valve body 72 and the head flange 88 to the lower diaphragm casing 50 in a fluid-tight manner. The diaphragm rod 64 extends in slidable relation through the head flange 88 to the interior of the valve body 72. In this way, the head flange 88 provides an upper guide for the diaphragm rod 64 and aids in isolating the control chamber of the lower diaphragm casing 50 from the turbulent chamber of the valve body 72.

An inner valve and cage assembly is mounted within the valve body 72, and consists of an aluminum cage 92 of tubular shape with four rectangular openings 94 in the periphery of the tubular section. A solid ring section 96 of the cage 92 above the rectangular openings 94 serves to retain an O-ring 98 at its outside diameter, and is threaded at its inside diameter 99 to retain a lower seat ring 100. The seat ring 100 provides a downwardly-directed sharp annular valve seat 101. A lower solid ring section 102 of the cage 92 is threaded at its outside diameter 103 for reception within a threaded bottom opening 104 of the valve body 72. A peripheral flange 106 receives a plurality of set screws 108.

A blind flange 110 provides a bottom end closure for the valve body 72, and is secured thereto by means of a plurality of cap screws 112. A gasket 114 cooperates to maintain a fluid-tight closure.

The inner valve assembly consists of an upper valve disc 116 and a lower valve disc 118, each of suitable composition rubber material, retained within corresponding upper and lower disc holders 120 and 122. A valve stem 124 serves to carry the disc holders 120 and 122 in predetermined spaced relation. An elastic stop nut 126 and a valve stem collar 128 serve to secure the upper disc holder 120 in fixed relation upon the valve stem 124. A valve stem collar 127 and lock nut 129 similarly secure the lower disc holder 122. The valve stem 124 provides a threaded shank 130 at its upper end for reception within a correspondingly threaded bore 132 of the diaphragm rod 64. O-rings 134 and 135 are provided to insure fluid isolation of the control chamber in the lower diaphragm casing 50 from the turbulent body chambers within the valve body 72, and of the body chambers from each other, thereby to insure a more accurate control of the regulator by the downstream control pressure introduced through the inlet port 54.

A valve stem locking arm 136 is secured to the valve stem 124 by tongue-and-groove means. The outer edges of the ears 138 of the locking arm 136 are retained in cast slots or grooves 140 inside the cage 92. In this way, a linear motion of the inner valve is provided while rotary movement of the valve is precluded. The valve stem locking arm 136 is held rigidly in place by an elastic stop nut 142. It will be apparent that the lower disc holder 122 is guided within the internal bore of the cage 92, thereby to provide a lower guide for the inner valve in cooperation with the upper guide provided by the head flange 88.

In FIGURE 3 of the drawing, we have illustrated a typical practical installation of the gas regulator of the present invention. The valve body inlet 74 and outlet 76 are shown in flow communication with a main flow line having an upstream conduit 150 and a downstream conduit. A by-pass line 154, having a gate valve or plug cock 156, is provided. A control line 157, having a shut-off valve 158, communicates downstream main line pressure with the control chamber of the lower diaphragm casing 50. The vent boss 22 may communicate through a suitable line with a remote vent for safety purposes. Supplemental main line shut-off valves 160 and 162 are also provided.

The construction of the inner valve and its aluminum cage enables the disassembly of the valve without removal of the body 72 from a main flow pipeline. Removal of the blind flange 110 permits easy access to the entire inner valve and cage assembly. The cage 92 is removed by loosening the set screws 108 and turning it out of the body 72. The inner valve and its stem 124 are easily unscrewed from the diaphragm rod 64 as the cage 92 is being removed. The cage and inner valve can then be readily disassembled, and either the inner valve assembly or seat rings replaced if desired.

When the cage 92 is replaced by rotating it to its position in the valve body 72, the valve stem 124 and the diaphragm rod 64 are aligned by holding the lower valve disc 118 against its seat 101 and turning the cage into the body until the valve stem shank 130 screws into the diaphragm rod bore 132.

An important feature of the cage assembly is the ease of adjusting the seat-to-seat spacing of the inner valve. All adjustments may be made through the blind flange 110, which eliminates the need for a hand hole in the side of the body. The complete inner valve and cage assembly, with the exception of the valve stem locking arm 136 and the elastic stop nut 142, is screwed into the valve body through the bottom flange opening 104 until the lower flange portion 106 of the cage 92 shoulders against the valve body 72. The valve stem 124 is then screwed into the diaphragm rod 64 until the elastic stop nut 126 shoulders against the lower end of the diaphragm rod 64. It will be noted that the cage assembly is both top and bottom guided while the seat-to-seat spacing adjustment is being made. To make this adjustment, the upper valve disc 116 is held against the upper valve seat 84, and the cage 92 is turned counter-clockwise out of the body 72 until the lower valve seat 100 contacts the lower valve disc 118. The set screws 108 are then tightened against the body 72 to hold the cage 92 in position.

The inner valve assembly is then rotated counter-clockwise until a milled slot 144 in the valve stem 124 lines up with the cast slot 140 in the cage. The valve stem locking arm 136 is then installed and secured in place with the elastic stop nut 142. The blind flange 110 and gasket 114 may then be again secured in place by means of the cap screws 112.

After the valve has been thus assembled, turning or spinning of the inner valve is prevented by the locking arm 136, thereby eliminating any possibility of the valve stem 124 unscrewing from the diaphragm rod 64 when the regulator is in operation.

With the exception of the synthetic rubber valve discs, O-rings, and gaskets, all of the inner valve parts and seat rings are constructed of brass. The diaphragm casings are preferably formed of heavy drawn steel, and a synthetic rubber diaphragm is mounted within them. The cage is formed of cast aluminum.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What we claim as new and desire to secure by Letters Patent of the United States is:

1. A gas regulator valve body assembly comprising a generally hollow valve body having a flow inlet and a flow outlet and a double-ported separating internal wall therebetween defining an upper opening and a lower opening, an upper valve seat member received in axially fixed relation within said upper opening, a cage assembly providing a lower valve seat member and received in axially slidable relation within said lower opening, a valve stem carrying a pair of valve members in spaced relation and extending axially movably through said cage for cooperation with said valve seat members, adjustable stop means carried by said cage assembly and engaging said valve body to position said lower valve seat member relative to said upper valve seat member and to the spacing between said pair of valve members, said valve body having an access opening permitting free removal of said cage assembly therefrom, and a blind flange providing a sealing closure for said access opening.

2. A gas regulator valve body assembly comprising a generally hollow valve body having a flow inlet and a flow outlet and a double-ported separating internal wall therebetween defining an upper opening and a lower opening, an upper valve seat member received in axially fixed relation within said upper opening, a cage assembly providing a lower valve seat member and received in axially slidable relation within said lower opening, a valve stem carrying a pair of valve members in spaced relation and extending axially movably through said cage for cooperation with said valve seat members, adjustable stop means carried by said cage assembly and engaging said valve body for axially-fixed positioning of said lower valve seat member relative to said upper valve seat member and to the spacing between said pair of valve members, thereby to enable adjustment of the seat-toseat spacing of said valve seat members, said valve body having an access opening permitting free removal of said cage assembly therefrom, and a blind flange providing a sealing closure for said access opening.

3. A gas regulator valve body assembly comprising a generally hollow valve body having a flow inlet and a flow outlet and a double-ported separating internal wall therebetween defining an upper opening and a lower opening, an upper valve seat member received in axially fixed relation within said upper opening, a cage assembly providing a lower valve seat member and received in axially slidable relation within said lower opening, a valve stem carrying a pair of valve members in spaced relation and extending axially movably through said cage for cooperation with said valve seat members, means carried by said valve stem preventing the latter from turning and axially slidably but non-rotatably engaging said cage, adjustable stop means carried by said cage assembly and engaging said valve body to position said lower valve seat member thereof relative to said upper valve seat member and to the spacing between said pair of valve members, said valve body having an access opening permitting free removal of said cage assembly therefrom, and a blind flange providing a sealing closure for said access opening.

4. In a gas regulator of the type including a diaphragm casing assembly and valve body assembly, the improvements in said valve body assembly comprising a generally hollow valve body having a flow inlet and a flow outlet and a double-ported separating internal wall therebetween defining an upper opening and a lower opening, an upper valve seat member received in axially fixed relation within said upper opening, a cage assembly providing a lower valve seat member and received in axially slidable relation within said lower opening, a valve stem carrying a pair of valve members in spaced relation and extending axially movably through said cage, a diaphragm rod extending from said diaphragm casing assembly into said valve body, upper guide means carried by said valve body for axially slidable support of said diaphragm rod, the inner ends of said diaphragm rod and said valve stem being removably interconnected, stop means carried by said cage assembly and engaging said valve body to position said lower valve seat member relative to said upper valve seat member and to the spacing between said pair of valve members, said valve body having an access opening permitting free removal of said cage assembly therefrom, means accessible through said access opening for removing said valve stem and valve members carried thereby from said diaphragm rod, whereby said valve stem and valve members are removable through said access opening, and a blind flange providing a sealing closure for said access opening.

5. In a gas regulator of the type including a diaphragm casing assembly and valve body assembly, the improvements in said valve body assembly comprising a generally hollow valve body having a flow inlet and a flow outlet and a double-ported separating internal wall therebetween defining an upper opening and a lower opening, an upper valve seat member received in axially fixed relation within said upper opening, a cage assembly providing a lower valve seat member and received in axially slidable relation within said lower opening, a valve stem carrying a pair of valve members in spaced relation and extending axially movably through said cage for cooperation with said valve seat members, adjustable stop means carried by said cage assembly and engaging said valve body to position said lower valve seat member relative to said upper valve seat member and to the spacing between said pair of valve members, said valve body having an access opening permitting free removal of said cage assembly therefrom, and a blind flange providing a sealing closure for said access opening.

6. In a gas regulator of the type including a diaphragm casing assembly and a valve body assembly, the improvements in said valve body assembly comprising a generally hollow valve body having a flow inlet and a flow outlet and a double-ported separating internal wall there-between defining an upper opening and a lower opening, an upper valve seat member received in axially fixed relation within said upper opening, a cage assembly providing a lower valve seat member and received in axially slidable relation within said lower opening, a valve stem carrying a pair of valve members in spaced relation and extending axially movably through said cage for cooperation with said valve seat members, adjustable stop means carried by said cage assembly and engaging said valve body for axially fixed positioning of said lower valve seat member relative to said upper valve seat member and to the spacing between said pair of valve members, thereby to enable adjustment of the seat-to-seat spacing of said valve seat members, said valve body having an access opening permitting free removal of said cage assembly therefrom, and a blind flange providing a sealing closure for said access opening.

7. A gas regulator valve body assembly comprising a generally hollow valve body having a flow inlet and a flow outlet and a double-ported separating internal wall therebetween defining an upper opening and a lower opening, an upper valve seat member threadedly received within said upper opening, a cage assembly received in axially slidable relation within said lower opening, a lower valve seat member threadedly received within said cage assembly, a valve stem carrying a pair of valve members in spaced relation and extending axially movably through said cage, a rod adapted for connection to the diaphragm of a gas regulator and axially movable in said valve body, threaded means interconnecting the inner ends of said rod and said valve stem, adjustable stop means carried by said cage assembly and engaging said valve body to position said lower valve seat member relative to said upper valve seat member and to the spacing between said pair of valve members, means forming an access opening in said valve body registering with said cage assembly and said valve seat members, said cage assembly being threadedly received within said access opening, means accessible through said access opening for removing said cage assembly from said threaded engagement in said access opening, means accessible through said access opening for removing said valve stem and valve members carried thereby from said threaded engagement with said rod, whereby said cage assembly and said valve stem and valve members are removable through said access opening, and a blind flange providing a sealing closure for said access opening.

8. A gas regulator valve body assembly as defined in claim 7 including removable means carried by said valve stem preventing the latter from turning and axially slidably but non-rotatably engaging said cage.

References Cited in the file of this patent
UNITED STATES PATENTS

| | | |
|---|---|---|
| 1,457,049 | Webb | May, 29, 1923 |
| 1,930,060 | Newman | Oct. 10, 1933 |
| 2,001,534 | Hughes | May 14, 1935 |
| 2,880,748 | Elsey | Apr. 7, 1959 |
| 2,916,047 | Butcher | Dec. 8, 1959 |